US007818660B2

(12) United States Patent
Massand

(10) Patent No.: US 7,818,660 B2
(45) Date of Patent: Oct. 19, 2010

(54) METHOD OF COMPOUND DOCUMENT COMPARISON

(75) Inventor: Deepak Massand, McLeansville, NC (US)

(73) Assignee: Litera Technology LLC, McLeansville, NC (US)

( * ) Notice: Subject to any disclaimer, the term of this patent is extended or adjusted under 35 U.S.C. 154(b) by 635 days.

(21) Appl. No.: 11/444,140

(22) Filed: May 30, 2006

(65) Prior Publication Data

US 2008/0301193 A1  Dec. 4, 2008

Related U.S. Application Data

(60) Provisional application No. 60/763,300, filed on Jan. 29, 2006.

(51) Int. Cl.
*G06F 17/00* (2006.01)
(52) U.S. Cl. ...................................... 715/209
(58) Field of Classification Search ............... 715/209
See application file for complete search history.

(56) References Cited

U.S. PATENT DOCUMENTS

| 3,920,895 | A | 11/1975 | Vieri et al. |
|---|---|---|---|
| 3,920,896 | A | 11/1975 | Bishop et al. |
| 5,008,853 | A | 4/1991 | Bly et al. |
| 5,129,082 | A | 7/1992 | Tirfing et al. |
| 5,146,552 | A | 9/1992 | Cassorla et al. |
| 5,204,947 | A | 4/1993 | Bernstein et al. |
| 5,321,505 | A | 6/1994 | Leddy |
| 5,341,469 | A | 8/1994 | Rossberg et al. |
| 5,515,491 | A | 5/1996 | Bates et al. |
| 5,539,871 | A | 7/1996 | Gibson |
| 5,596,700 | A | 1/1997 | Darnell et al. |
| 5,596,705 | A | 1/1997 | Reimer et al. |
| 5,606,609 | A | * 2/1997 | Houser et al. ............... 713/179 |
| 5,659,676 | A | 8/1997 | Redpath |
| 5,664,208 | A | * 9/1997 | Pavley et al. ................ 715/209 |
| 5,669,005 | A | 9/1997 | Curbow et al. |
| 5,671,428 | A | 9/1997 | Muranaga et al. |
| 5,694,544 | A | 12/1997 | Tanigawa et al. |
| 5,706,452 | A | 1/1998 | Ivanov |
| 5,706,502 | A | 1/1998 | Foley et al. |
| 5,708,826 | A | 1/1998 | Ikeda et al. |
| 5,708,845 | A | 1/1998 | Wistendahl et al. |
| 5,740,444 | A | 4/1998 | Frid-Nielsen |
| 5,752,055 | A | 5/1998 | Redpath et al. |
| 5,758,313 | A | 5/1998 | Shah et al. |

(Continued)

OTHER PUBLICATIONS

U.S. Appl. No. 12/350,144, filed Jan. 7, 2009.

(Continued)

*Primary Examiner*—Rachna S Desai
(74) *Attorney, Agent, or Firm*—Finnegan, Henderson, Farabow, Garrett & Dunner, LLP

(57) ABSTRACT

A method and system for comparing compound documents. An original compound document and a modified compound document are analyzed to determine and mark the location of embedded objects. A comparison is performed between an original primary document and the modified primary document, ignoring the embedded objects, the output of which is a comparison output document. The embedded objects are compared by copying the contents of the embedded objects to compatible documents, comparing the embedded object from the original compound document and the embedded object from the modified compound document, the output of which is inserted into the comparison output document using the location markers of the embedded objects.

19 Claims, 6 Drawing Sheets

U.S. PATENT DOCUMENTS

| | | | |
|---|---|---|---|
| 5,761,419 | A | 6/1998 | Schwartz et al. |
| 5,761,499 | A | 6/1998 | Sonderegger |
| 5,781,732 | A | 7/1998 | Adams |
| 5,781,901 | A | 7/1998 | Kuzma |
| 5,787,175 | A | 7/1998 | Carter |
| 5,799,191 | A | 8/1998 | Moriyasu et al. |
| 5,801,702 | A | 9/1998 | Dolan et al. |
| 5,809,512 | A | 9/1998 | Kato |
| 5,860,073 | A | 1/1999 | Ferrel et al. |
| 5,864,870 | A | 1/1999 | Guck |
| 5,870,754 | A | 2/1999 | Dimitrova et al. |
| 5,878,421 | A | 3/1999 | Ferrel et al. |
| 5,890,177 | A | 3/1999 | Moody et al. |
| 5,893,126 | A | 4/1999 | Drews et al. |
| 5,911,776 | A | 6/1999 | Guck |
| 5,931,906 | A | 8/1999 | Fidelibus, Jr. et al. |
| 5,937,066 | A | 8/1999 | Gennaro et al. |
| 5,938,724 | A | 8/1999 | Pommier et al. |
| 5,941,944 | A * | 8/1999 | Messerly ................... 709/203 |
| 5,944,785 | A | 8/1999 | Pommier et al. |
| 5,949,413 | A | 9/1999 | Lerissa et al. |
| 5,950,214 | A | 9/1999 | Rivette et al. |
| 5,956,736 | A | 9/1999 | Hanson et al. |
| 5,958,006 | A | 9/1999 | Eggleston et al. |
| 5,978,836 | A | 11/1999 | Ouchi |
| 5,987,469 | A | 11/1999 | Lewis et al. |
| 6,009,462 | A | 12/1999 | Birrell et al. |
| 6,014,135 | A | 1/2000 | Fernandes |
| 6,029,171 | A | 2/2000 | Smiga et al. |
| 6,064,751 | A | 5/2000 | Smithies et al. |
| 6,067,551 | A | 5/2000 | Brown et al. |
| 6,088,709 | A | 7/2000 | Watanabe |
| 6,119,147 | A | 9/2000 | Toomey et al. |
| 6,158,903 | A | 12/2000 | Schaeffer et al. |
| 6,178,431 | B1 | 1/2001 | Douglas |
| 6,182,080 | B1 | 1/2001 | Clements |
| 6,212,534 | B1 | 4/2001 | Lo et al. |
| 6,243,722 | B1 | 6/2001 | Day et al. |
| 6,289,460 | B1 | 9/2001 | Hajmiragha |
| 6,317,777 | B1 | 11/2001 | Skarbo et al. |
| 6,324,555 | B1 * | 11/2001 | Sites ........................ 715/234 |
| 6,334,141 | B1 | 12/2001 | Varma et al. |
| 6,336,134 | B1 | 1/2002 | Varma |
| 6,343,313 | B1 | 1/2002 | Salesky et al. |
| 6,360,236 | B1 | 3/2002 | Khan et al. |
| 6,363,352 | B1 | 3/2002 | Dailey et al. |
| 6,411,989 | B1 | 6/2002 | Anupam et al. |
| 6,560,637 | B1 | 5/2003 | Dunlap et al. |
| 6,590,584 | B1 | 7/2003 | Yamaura et al. |
| 6,643,663 | B1 | 11/2003 | Dabney et al. |
| 6,681,371 | B1 * | 1/2004 | Devanbu .................... 715/209 |
| 6,687,878 | B1 | 2/2004 | Eintracht et al. |
| 6,708,172 | B1 | 3/2004 | Wong et al. |
| 7,251,680 | B2 | 7/2007 | DeVos |
| 2001/0037367 | A1 | 11/2001 | Iyer |
| 2002/0049786 | A1 | 4/2002 | Bibliowicz et al. |
| 2002/0059342 | A1 | 5/2002 | Gupta et al. |
| 2002/0059343 | A1 | 5/2002 | Kurishima et al. |
| 2002/0065848 | A1 | 5/2002 | Walker et al. |
| 2002/0078088 | A1 | 6/2002 | Kuruoglu et al. |
| 2002/0085030 | A1 | 7/2002 | Ghani |
| 2002/0107886 | A1 | 8/2002 | Gentner et al. |
| 2002/0143691 | A1 | 10/2002 | Ramaley et al. |
| 2003/0112273 | A1 | 6/2003 | Hadfield et al. |
| 2003/0158855 | A1 | 8/2003 | Farnham et al. |
| 2003/0197730 | A1 | 10/2003 | Kakuta et al. |
| 2003/0217336 | A1 * | 11/2003 | Gounares et al. ............ 715/541 |
| 2004/0085354 | A1 | 5/2004 | Massand |
| 2004/0205653 | A1 | 10/2004 | Hadfield et al. |
| 2005/0108280 | A1 * | 5/2005 | Kagle et al. ............ 707/103 R |
| 2006/0167879 | A1 | 7/2006 | Umeki et al. |
| 2006/0253482 | A1 | 11/2006 | Zellweger et al. |
| 2006/0262339 | A1 * | 11/2006 | Jacobs et al. ............... 358/1.14 |
| 2007/0186157 | A1 | 8/2007 | Walker et al. |
| 2009/0119578 | A1 * | 5/2009 | Relyea et al. ............... 715/234 |

OTHER PUBLICATIONS

U.S. Appl. No. 12/406,093, filed Mar. 17, 2009.
Deepak Massand, Method of removing metadata from email attachments, U.S. Appl. No. 11/699,750, filed Jan. 29, 2007.

* cited by examiner

METHOD OF COMPOUND DOCUMENT COMPARISON

RELATED APPLICATION DATA

This patent application claims priority to U.S. Provisional Patent Application No. 60/763,300, filed Jan. 29, 2006, which is hereby incorporated by reference.

BACKGROUND

1. Field of the Invention

The field of the invention relates generally to systems and methods of electronic document comparison.

2. Related Background

FIGS. 1 and 2 illustrate the relationship between documents, objects, users and applications users may use to create, modify, compare and manage electronic documents.

An electronic document, or document, may be viewed as a collection of user-input data used with a certain application (such as, Microsoft Word®, Corel WordPerfect® and Microsoft Excel®). In a general sense, a document is the data or information generated when using a computer application. FIG. 1 is a generalized block diagram illustrating the relationships between a document that may be used with the present invention and an application as such relationships exist in conventional document creation, management and editing programs. A user 101 interacts with an application 102 to create, view, alter, edit or manage a document 103. The application makes use of the document so the user may edit the document, view the document, or perform other actions in relation to the document.

With the advent of OLE (Object Linking and Embedding), a document may contain data from other applications as well as from the main application. The data from other applications are contained in "objects", or "document objects." One example of the use of OLE is when a Word document has a spreadsheet table from Excel embedded within it. In this example the excel spreadsheet is an object within a Word document. Embedded objects may include text, tables, pictures or drawings, or other forms of data. A document with one or more objects from other applications is typically referred to as a "Compound Document". Unless otherwise specified, an "object" refers to a section of the document that is created from, or edited by, an application other than the application that edits or creates the primary document the object is embedded into.

Single format documents, that is documents not including embedded objects from other applications, are often compared using the well-known algorithm called 'LCS' (longest known sequence) or HCS (heaviest common sequence) to determine differences between two documents. There exist specialized adaptations or versions of LCS and HCS specially made to compare Word Documents, Excel Documents, HTML documents and PDF documents. In addition to LCS, other comparison algorithms include: HCS (heaviest common sequence), LCSS (longest common sub sequence) or MSS (matching similarity sequence). These comparison algorithms are implemented in comparison engines, some of which are integrated into document creation and editing applications (such as Word, Excel, Open Office™, StarOffice™, etc.), and some of which are implemented separately from the document creation and editing applications, as discussed below in connection with FIG. 3.

FIG. 2 is a generalized block diagram illustrating the relationship between the objects of an electronic document and the corresponding application used to create, edit or view them. A compound document 201, such as a Word document, may incude objects such as an Excel spreadsheet, a picture, a PowerPoint slide or graphic, and a Visio drawing. The compound document 201 is created and edited by an application 202. In this example, the application creating and editing a compound Word document may be Microsoft's Word program. The applications 203 creating and editing the embedded objects are, respectively, Microsoft's Excel, Paint, PowerPoint and Visio.

Conventional document management, creation, editing and viewing applications often include the ability to compare documents and output a document which illustrates the differences between two documents. Typically, the output document including indications of the differences between the two input documents is referred to as a "redline" or "redline document." FIG. 3 is a generalized block diagram illustrating a conventional document comparison application as may be found in the prior art. A document comparison engine 303 may compare an original document 301 (or first document) to a modified document 302 (or second document). The output of the comparison is a "redline" document or comparison output document 304. Typically, the comparison output document provides indications of what has changed between the original document and the modified document. Conventional document comparison engines and applications provide for comparison of single format documents.

Accordingly, a need exists to provide a comparison system and method capable of comparing compound documents.

SUMMARY

The present invention provides for a computer based system and method for comparing compound documents. An original compound document and a modified compound document are analyzed to determine and mark the location of embedded objects. A comparison is performed between an original primary document and the modified primary document, ignoring the embedded objects, the output of which is a comparison output document. The embedded objects are compared by copying the contents of the embedded objects to compatible documents, comparing the embedded object from the original compound document and the embedded object from the modified compound document, the output of the comparison is inserted into the comparison output document using the location markers of the embedded objects.

DETAILED DESCRIPTION

The present invention is described in the context of a specific embodiment. This is done to facilitate the understanding of the features and principles of the present invention and the present invention is not limited to this embodiment. In particular, the present invention is described in the context of a computer system used to compare, edit, view and/or modify electronic documents.

Figure 1:
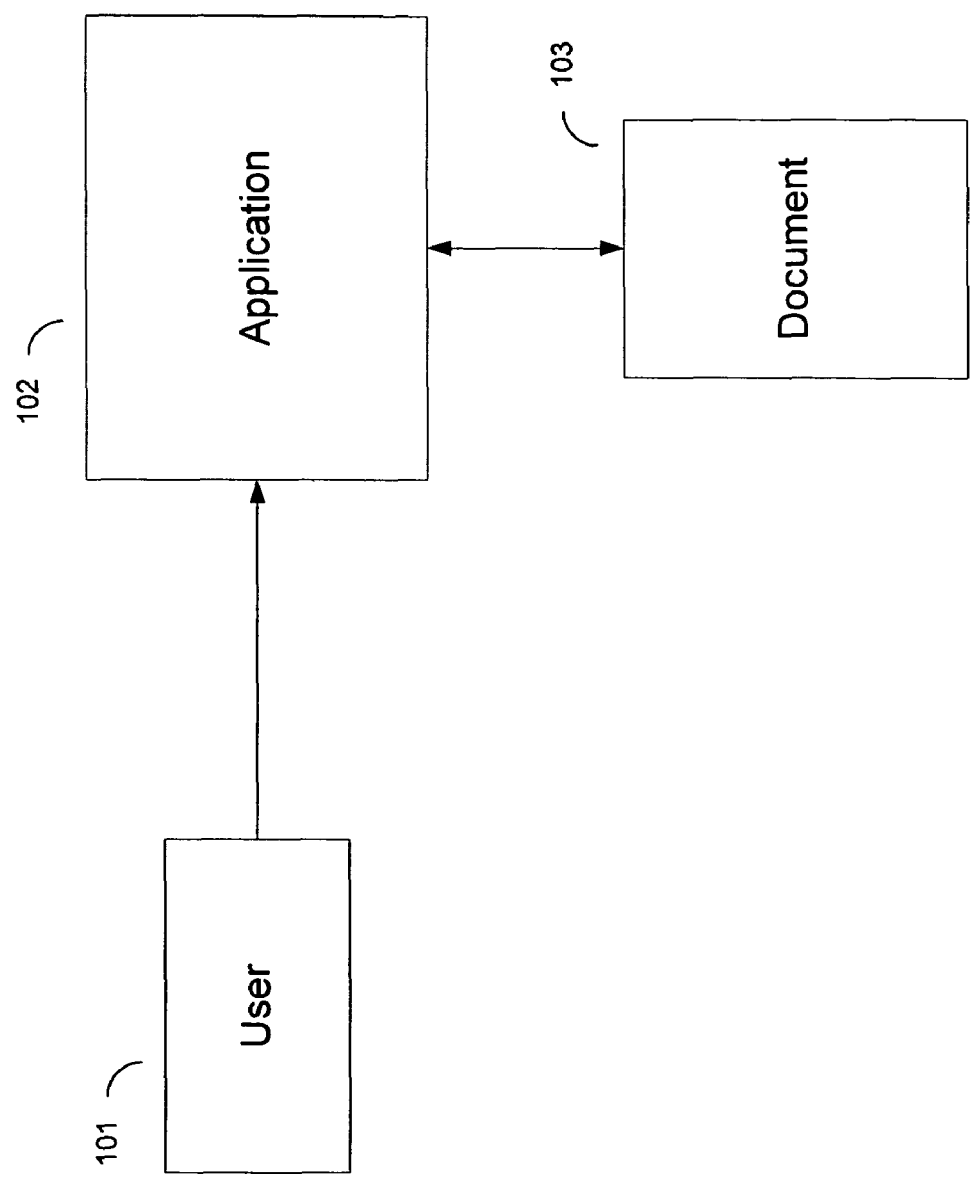
FIG. 1 is a generalized block diagram illustrating the relationships between an electronic document that may be used with the present invention and an application of the prior art that may be used to create or modify such an electronic document.
Figure 2:
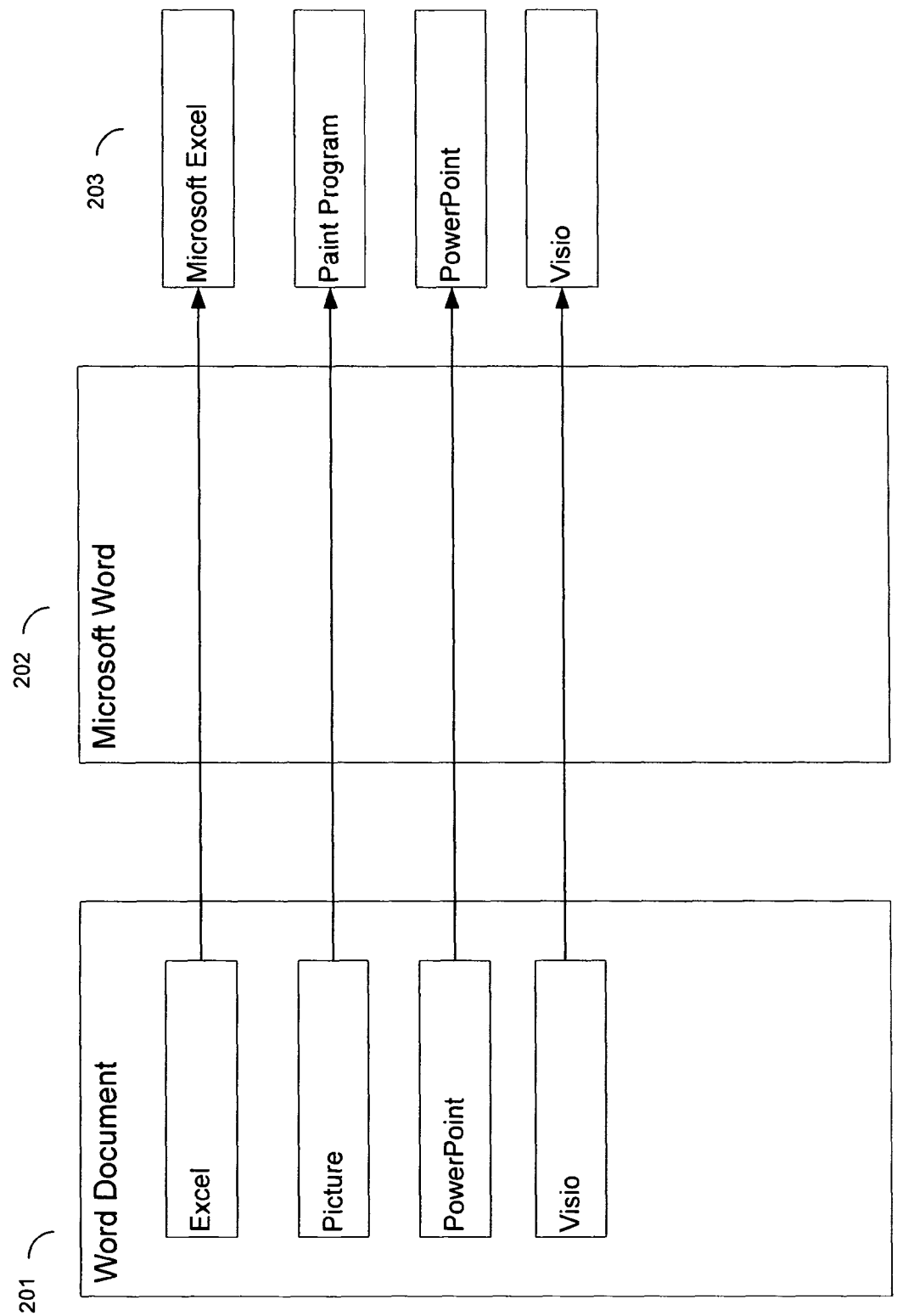
FIG. 2 is a generalized block diagram illustrating the relationship between the objects of a electronic document that may be used with the present invention and a corresponding application of the prior art used to create, edit or view such objects.
Figure 3:
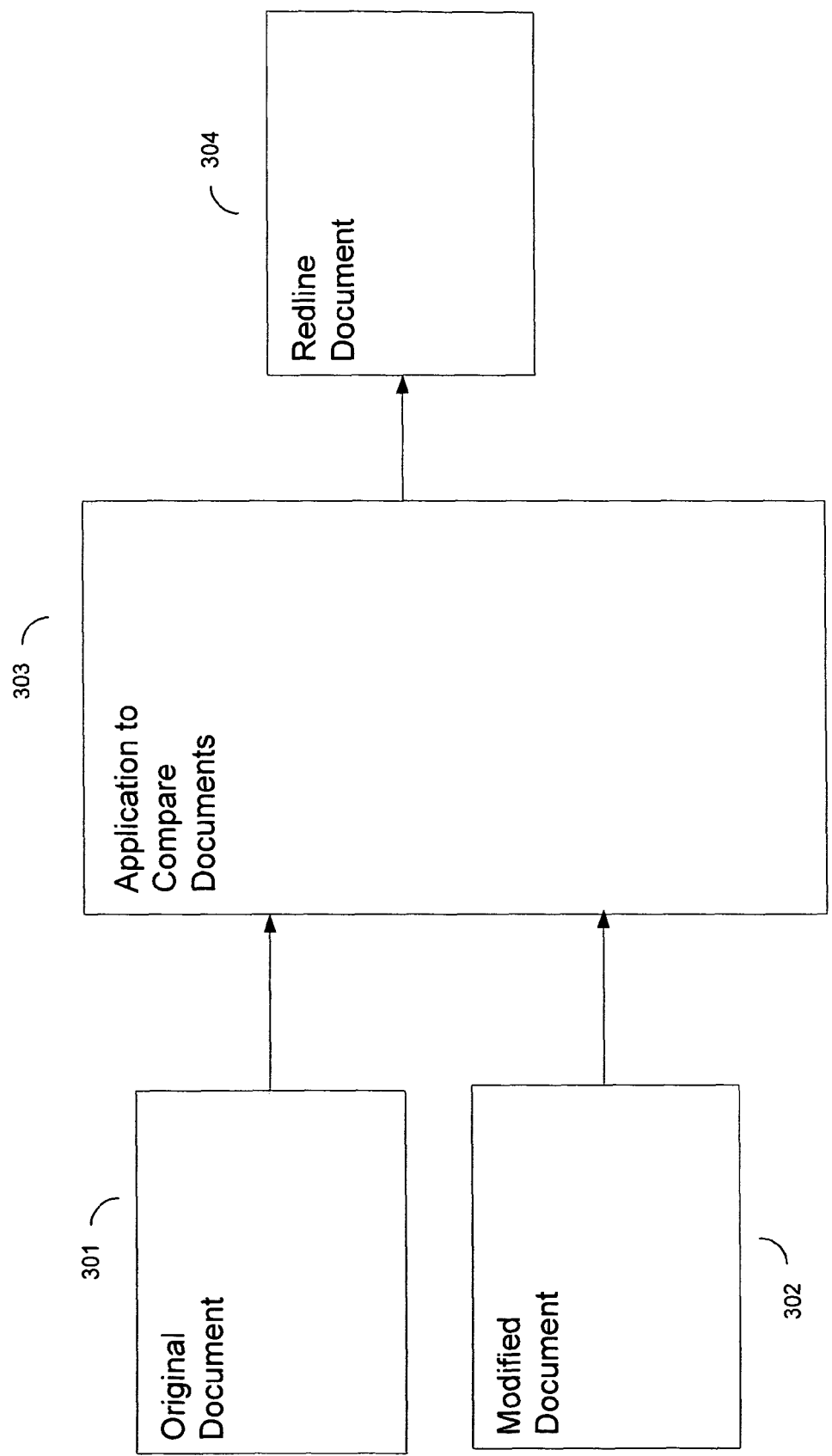
FIG. 3 is a generalized block diagram illustrating a conventional document comparison application as may be found in the prior art.
Figure 4:
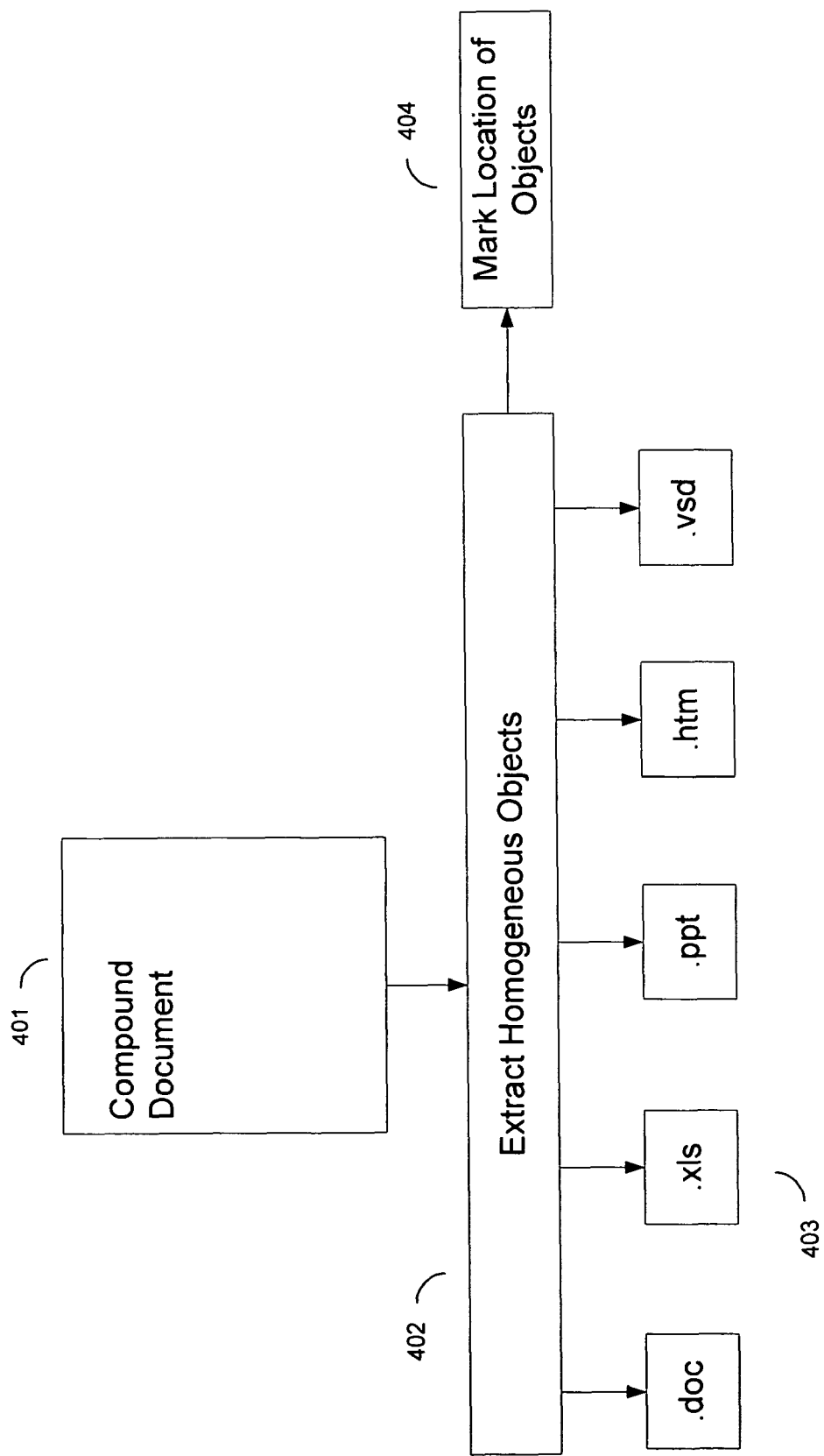
FIG. 4 is a generalized block diagram illustrating the extraction and marking of embedded objects in a document to be compared, according to one possible embodiment.

FIG. 4 is a generalized block diagram illustrating the extraction and marking of embedded objects in a document to be prepared. A compound document 401 has the objects 403 embedded in the document and "extracted" 402. In the presently preferred embodiment, extraction involves copying the object to a corresponding document of the same document type, or document format, as the object being copied. Additionally, the location (or locations) 404 of the objects in the primary document are marked. In the presently preferred embodiment, the location is marked in the primary document file. Alternatively, the position of the objects may be marked outside of the primary document, for example in a database or in another file.

Figure 5:
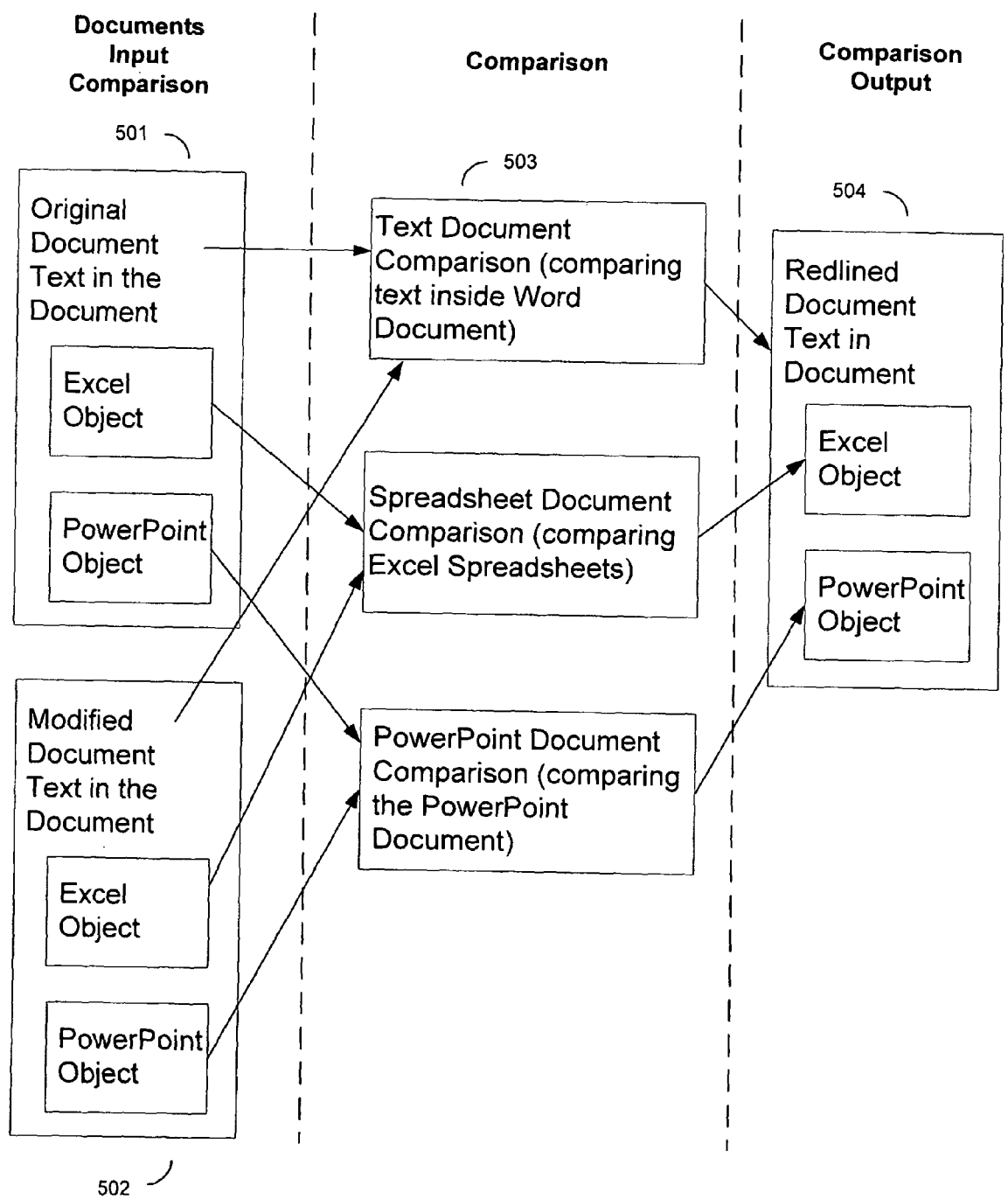
FIG. 5 is a generalized block diagram illustrating the comparison of compound document objects, according to one possible embodiment.

FIG. 5 is a generalized block diagram illustrating the comparison of compound document objects. The input documents to the comparison process, the original document 501 and the modified document 502, contain embedded objects 503 from a different document type than the primary document. In the example embodiment shown there are two embedded objects in the input documents, one Excel object and one PowerPoint object. The primary document type of the input documents are Word documents. The marked location information is used in the comparison process to confine the comparison to the primary document type, thereby excluding the embedded objects from the comparison of the primary document type.

The comparison process compares the text of the primary document type of the input documents, the results of the comparison output to a primary comparison output document. The comparison of the first embedded object types, the Excel objects, are is output to the comparison output document as an Excel object embedded in the primary comparison output document according to the marked location information. The marked location information is used to locate the comparison output of the Excel objects in the comparison output object. Similarly, the comparison of the second embedded object types, the PowerPoint objects, are output to the comparison output document as an PowerPoint object embedded in the comparison output document. The marked location information is used to position the comparison output of the PowerPoint objects in the comparison output document.

While the example input documents only contained two embedded objects, alternate embodiments may contain more or fewer embedded objects. With such input documents, the presently preferred embodiment compares all of the embedded objects of the input documents. However, alternative embodiments may choose to ignore one or more embedded object pairs (an embedded object pair includes an original embedded object from the original input document and the corresponding embedded object from the modified input document), or choose to ignore one ore more embedded object types, from comparison. In yet another alternative embedment, the user may indicate, through a comparison command, or through configuration of a document application implementing an alternative embodiment, that certain objects or certain object types are to be ignored from comparison.

Additionally, input documents may contain multiple embedded objects of the same document type located at different positions within the primary document (for example, a Word document with multiple Excel spreadsheets located at different positions within the Word document). In the presently preferred embodiment, the multiple embedded objects are compared and the results of the comparisons are embedded in objects in the comparison output document, using the marked location information.

Figure 6:
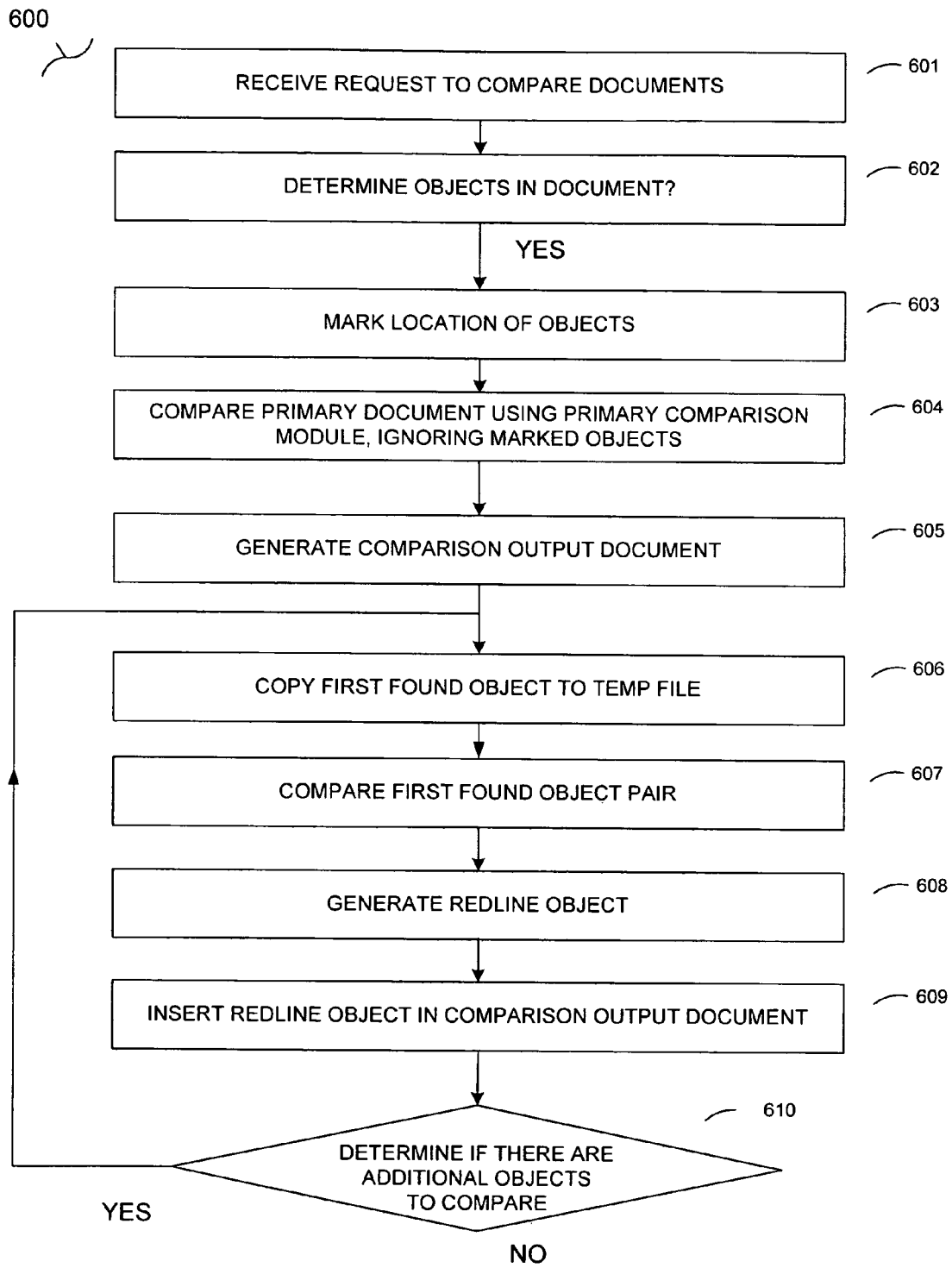
FIG. 6 is a generalized flow diagram illustrating the process of finding the differences in compound documents, according to one possible embodiment.

FIG. 6 is a generalized flow diagram illustrating the process of comparing documents to find the differences in the compound documents by opening the document identified for comparison. At step 601 a request to compare documents is received. The request may be from a user, or from another program or process. At step 602 the input comparison document (or primary input document), the document designated for comparison, is examined for OLE objects. In the presently preferred embodiment, at step 601 both the original input document and the modified input document are examined for OLE objects. If an OLE object is found at step 602, then at step 603 the location of the discovered OLE object is marked. At step 604 the primary comparison documents are compared, ignoring the embedded objects. In the preferred embodiment, the comparison process ignores the embedded objects using the location markings from step 603. At step 605 the results of the comparison of the primary comparison documents is output to a primary comparison output document, or "redline" primary comparison document. Referring to the example of FIG. 5, the output of step 605 is comparison output primary document which is a Word document, or a comparison output Word document.

At step 606 the OLE objects found at step 602, in one embodiment are copied to a document of the type that created the object to create an object comparison document. That is, if the object contains data which is from a given application, the data of the object is copied to a document of the type of the given application (or to a compatible application document type). As an example, if the OLE object were of the type created by PowerPoint, preferably the data of this object is copied to a PowerPoint comparison document. Similar action is taken for OLE objects from other applications. Step 606 is performed for both the object from the original comparison document and from the modified comparison document, thus resulting in an original OLE object comparison document and a modified OLE object comparison document.

At step 607 a comparison engine of the type to compare documents of the given application is initiated to compare the original OLE object comparison document and the modified OLE object comparison document. Thus, referring again to the example of FIG. 5, step 607 initiates the comparison engine to compare Excel object comparison documents created at step 606. Similarly, at step 607 the comparison engine to compare PowerPoint documents is initiated to compare the PowerPoint object comparison documents created at step 606. At step 607 the original OLE object comparison document and modified OLE object comparison document are compared using a comparison engine appropriate for the document type of the object. The results of the comparison performed at step 607 generates a "redline" OLE object document, or comparison output OLE object document, are placed in a comparison output primary document, or "redline" primary document at step 608. Referring again to the example of FIG. 5, the output of step 607 is a comparison output Excel object document and a comparison output PowerPoint document.

Step 609 inserts the comparison output OLE object document (or documents) in the comparison output primary document output from step 605. Referring again to the example of FIG. 5, the comparison output Excel object document and comparison output PowerPoint document are inserted at the comparison output Word document.

The insertion of the comparison output OLE object document uses the OLE object marking information from step 601. By using the location markings the comparison output document is able to provide the user with a document that has a similar organization to the original and modified input documents.

If the comparison input documents included additional embedded objects which have not been compared, at step 610 the comparison process returns to step 606 to compare the next embedded object pair. If there are no additional embedded objects which have not been compared (or there are no embedded objects which have not been designated to exempt from comparison).

While the above embodiments and examples compared only two documents, alternate embodiments could compare three or more documents.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

I claim:

1. A method of comparing compound documents, wherein a compound document comprises a primary document and an OLE object, comprising:
    copying a first OLE object from a first compound document to a document of a type corresponding to an application that created the OLE object, creating a first OLE object comparison document;
    copying a second OLE object from a second compound document to a second OLE object comparison document;
    initiating a comparison engine to compare the first OLE object comparison document with the second OLE object comparison document, wherein the comparison engine generates a comparison output OLE object document;
    placing the comparison output OLE object document in a comparison output document; and
    initiating a primary document comparison engine to compare a first primary document and a second primary document, wherein the output of the comparison is included in the comparison output document.

2. The method of claim 1, wherein the primary document is one of a group consisting of a Word document, an Excel document, a PDF document, a Visio document, and a PowerPoint document.

3. The method of claim 1, wherein copying the first OLE object further comprises:
    copying the first OLE object to a document of a type that may be opened by an application that created the first OLE object.

4. The method of claim 1, wherein placing the comparison output OLE object document in the comparison output document is performed in accordance with OLE object location information retrieved from the first compound document or the second compound document.

5. The method of claim 1, further comprising:
    excluding an OLE object embedded in the compound document from comparison.

6. The method of claim 5, wherein the excluding occurs in response to a command from a user.

7. The method of claim 5, wherein the excluding occurs according to the document type of the OLE object.

8. A method of comparing documents, comprising:
    determining that a first document comprising a first primary document contains an OLE object;
    marking a first location of the OLE object;
    copying the OLE object to a document of a type corresponding to a document type of the OLE object, creating a first discovered object comparison document;
    determining that a second document comprising a second primary document contains a corresponding OLE object having the document type of the first OLE object;
    marking a second location of the corresponding OLE object;
    copying the corresponding OLE object to a second discovered object comparison document;
    comparing the first primary document with the second primary document using a comparison engine that corresponds to a document type of the primary documents, generating a comparison output document from the results of the comparing;
    comparing the first discovered object comparison document with the second discovered object comparison document using a comparison engine that corresponds to the document type of the OLE object;
    inserting a result of the comparing of the first discovered object comparison document and the second discovered object comparison document in the comparison output document according to at least one of the first location and the second location; and
    displaying the result of the comparing using a format that draws attention to differences.

9. The method of claim 8, further comprising:
    in the event multiple OLE objects having different document types are discovered in the documents:
    copying OLE objects of a first document type from the documents to a documents of a type corresponding to the first document type to create first type discovered object comparison documents;
    copying OLE objects of a second document type from the documents to a documents of a type corresponding to the second document type to create second type discovered object comparison documents;
    comparing the first type discovered object comparison documents with a comparison engine that corresponds to the first document type;
    inserting a result of the comparing of the first type discovered object comparison documents into the comparison output document;
    comparing the second type discovered object comparison documents with a comparison engine that corresponds to the second document type; and inserting a result of the comparing of the second type discovered object comparison documents into the comparison output document.

10. The method of claim 8 wherein the format is one of a group consisting of a color format, an underline format, a bold format, and an italics format.

11. The method of claim 8 wherein the format is one of a group consisting of displaying additions with underlining and displaying deletions with strikethroughs.

12. A method of comparing documents, comprising:
receiving at least two input documents for comparison, wherein each input document comprises a primary document and an OLE object;
marking a first location of a first OLE object embedded in a first input document among the at least two input documents;
copying the first OLE object to a first object comparison document;
marking a second location of a second OLE object embedded in a second input document among the at least two input documents;
copying the second OLE object to a second object comparison document;
comparing primary documents of the at least two input documents;
creating a comparison output document from a result of the comparing of the primary documents of the at least two input documents;
comparing the first object comparison document and the second object comparison document; and
inserting a result of the comparing of the first object comparison document and the second object comparison document into the comparison output document.

13. The method of claim 12, wherein the inserting comprises:
inserting the result of the comparison according to at least one of the first location and the second location.

14. The method of claim 12 wherein the first object comparison document is of a type that corresponds to a document type of the first OLE object.

15. The method of claim 14, wherein the first object comparison document is of a same document type as the first OLE object.

16. The method of claim 15, wherein the primary document is one of a group consisting of a Word document, an Excel document, a PDF document, a Visio document, and a PowerPoint document.

17. The method of claim 16, wherein the document type of at least one of the first OLE object and the second OLE object is one of a group consisting of an Excel document type, a PowerPoint document type, a Visio document type, a PDF document type, a CAD document type, a JPEG document type, a GIFF document type, a TIFF document type, a PSD document type, a PNG document type, and a BIT MAP document type.

18. The method of claim 12, wherein the result of the comparing is displayed using a format that differentiates any changes in the comparison output document.

19. The method of claim 18 wherein the format is one of a group consisting of a color format, an underline format, a bold format, and an italics format.

* * * * *

UNITED STATES PATENT AND TRADEMARK OFFICE
CERTIFICATE OF CORRECTION

| | | |
|---|---|---|
| PATENT NO. | : 7,818,660 B2 | |
| APPLICATION NO. | : 11/444140 | |
| DATED | : October 19, 2010 | |
| INVENTOR(S) | : Deepak Massand | |

It is certified that error appears in the above-identified patent and that said Letters Patent is hereby corrected as shown below:

In claim 9, column 6, line 52, "documents to a documents" should read --documents to documents--.

In claim 9, column 6, line 56, "documents to a documents" should read --documents to documents--.

Signed and Sealed this
Twenty-eighth Day of December, 2010

David J. Kappos
*Director of the United States Patent and Trademark Office*